US012680906B2

(12) United States Patent
Sudo et al.

(10) Patent No.: US 12,680,906 B2
(45) Date of Patent: Jul. 14, 2026

(54) VIBRATION TEST DEVICE WITH DIAGNOSIS UNIT

(71) Applicant: IMV CORPORATION, Osaka (JP)

(72) Inventors: Mutsuhito Sudo, Osaka (JP); Yasuhiro Uchiyama, Osaka (JP); Katsuhiko Nakamura, Osaka (JP)

(73) Assignee: IMV CORPORATION, Osaka (JP)

( * ) Notice: Subject to any disclaimer, the term of this patent is extended or adjusted under 35 U.S.C. 154(b) by 299 days.

(21) Appl. No.: 18/547,922

(22) PCT Filed: Jul. 20, 2022

(86) PCT No.: PCT/JP2022/028269
§ 371 (c)(1),
(2) Date: Aug. 25, 2023

(87) PCT Pub. No.: WO2023/026728
PCT Pub. Date: Mar. 2, 2023

(65) Prior Publication Data
US 2024/0280433 A1 Aug. 22, 2024

(30) Foreign Application Priority Data
Aug. 27, 2021 (JP) ................................. 2021-139381

(51) Int. Cl.
*G01M 7/04* (2006.01)
(52) U.S. Cl.
CPC ..................................... *G01M 7/04* (2013.01)
(58) Field of Classification Search
CPC ........................... G01M 7/00–08; G05B 23/02
See application file for complete search history.

(56) References Cited

U.S. PATENT DOCUMENTS 3,572,089 A * 3/1971 Chapman .............. G01M 7/022
73/664
2007/0285079 A1* 12/2007 Nasle ...................... G06F 30/20
324/76.22
(Continued)

FOREIGN PATENT DOCUMENTS

CN 101281087 B * 6/2010 .............. G01M 7/02
CN 110907112 A * 3/2020 .............. G01M 7/06
(Continued)

OTHER PUBLICATIONS

The extended European search report of the corresponding EP application No. 22861019.2 mailed Jul. 28, 2025.

*Primary Examiner* — David L Singer
(74) *Attorney, Agent, or Firm* — Muncy, Geissler, Olds & Lowe, P.C.

(57) ABSTRACT

There is provided a vibration test device capable of accurately performing self-diagnosis related to the state of the vibration test device, including a failure determination, a failure prediction, and a performance limit determination of the vibration test device. A vibration test device 200 including a shaker 100 configured to shake a shaker table 48, includes: a drive controller 120 configured to control drive of the shaker 100 by controlling current and voltage applied to the shaker 100; a current detector 171 configured to detect the current that controls vibration of the shaker 100; a voltage detector 172 configured to detect the voltage that controls vibration of the shaker 100; a motion detector 135 configured to detect physical quantities related to a motion of the shaker table 48; and a determiner 134 configured to perform a determination related to a state of the vibration test device 200, including a failure determination, a failure prediction, and a performance limit determination, based on (Continued)

171: Current Detector    135: 3-axis Acceleration Sensor
172: Voltage Detector    136: Control Sensor detection signals from the current detector 171, the voltage detector 172, and the motion detector 135.

17 Claims, 7 Drawing Sheets

(56) References Cited

U.S. PATENT DOCUMENTS

| | | | | |
|---|---|---|---|---|
| 2009/0205430 A1* | 8/2009 | Goodfellow | .......... | G01M 7/022 |
| | | | | 73/662 |
| 2012/0330614 A1* | 12/2012 | Kar | ........................ | G01H 1/003 |
| | | | | 702/185 |
| 2013/0305828 A1* | 11/2013 | Alderson | .............. | G01M 7/022 |
| | | | | 73/663 |
| 2017/0011298 A1* | 1/2017 | Pal | ........................ | G06N 20/00 |
| 2017/0115179 A1* | 4/2017 | Williamson | ............ | G01M 7/02 |
| 2018/0181086 A1* | 6/2018 | Kostyukov | ........ | G05B 23/0232 |
| 2021/0123832 A1* | 4/2021 | Johnson | .............. | G01M 13/026 |

FOREIGN PATENT DOCUMENTS

| | | | | | |
|---|---|---|---|---|---|
| CN | 110987337 A | * | 4/2020 | ............ | G01M 7/025 |
| DE | 102018127457 A1 | * | 5/2020 | .............. | G01M 7/02 |
| JP | H0114525 B2 | * | 3/1989 | ............ | G01M 7/00 |
| JP | 2005062097 A | * | 3/2005 | .............. | G01M 7/02 |
| JP | 2005-241089 A | | 9/2005 | | |
| JP | 2011064583 A | * | 3/2011 | .............. | G01M 7/02 |
| JP | 2019-002731 A | | 1/2019 | | |
| JP | 2021-033486 A | | 3/2021 | | |
| JP | 2021096238 A | * | 6/2021 | ............ | G01M 7/02 |
| WO | WO-2005108947 A1 | * | 11/2005 | ............ | G01M 7/022 |
| WO | 2011/133784 A1 | | 10/2011 | | |

* cited by examiner

171: Current Detector
172: Voltage Detector

135: 3-axis Acceleration Sensor
136: Control Sensor

135: 3-axis Acceleration Sensor

CHANGES IN 6DOF COHERENCE (ROLL)

FIG.6

Roll

6DOF TRANSMISSION FUNCTION (ROLL)

FIG.7A

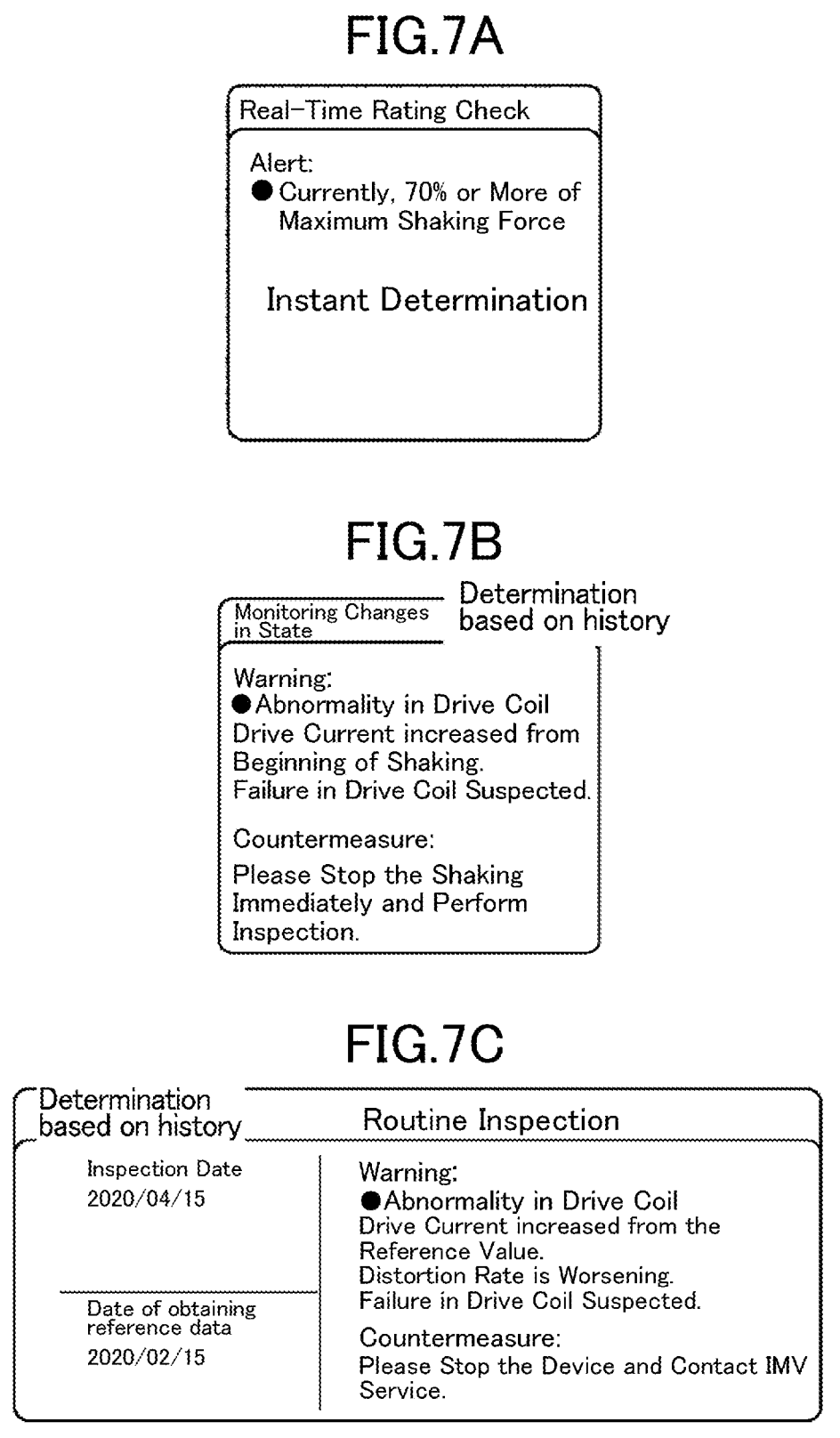

Real-Time Rating Check

Alert:
● Currently, 70% or More of
   Maximum Shaking Force

Instant Determination

FIG.7B

Monitoring Changes
in State       Determination
based on history

Warning:
●Abnormality in Drive Coil
Drive Current increased from
Beginning of Shaking.
Failure in Drive Coil Suspected.

Countermeasure:
Please Stop the Shaking
Immediately and Perform
Inspection.

FIG.7C

Determination
based on history     Routine Inspection

| Inspection Date<br>2020/04/15 | Warning:<br>●Abnormality in Drive Coil<br>Drive Current increased from the<br>Reference Value.<br>Distortion Rate is Worsening.<br>Failure in Drive Coil Suspected. |
| Date of obtaining<br>reference data<br>2020/02/15 | Countermeasure:<br>Please Stop the Device and Contact IMV<br>Service. |

VIBRATION TEST DEVICE WITH DIAGNOSIS UNIT

TECHNICAL FIELD

The present invention relates to a vibration test device including a shaker configured to shake a shaker table and capable of performing self-diagnosis including a failure determination, a failure prediction, and a performance limit determination.

BACKGROUND ART

Traditionally, there has been known a vibration test device for a vibration test on various articles such as automobile parts and tires. A shaker in such a vibration test device has a shaker table. The vibration test is performed by vibrating the shaker table while a test piece is held on the shaker table. By having the shaker vibrating the test piece so as to simulate the actual state of use, the vibration characteristics and safety of the item can be evaluated.

When the shaker table is shaken, the shaker table may vibrate not only in a shaking direction but also in a direction other than the shaking direction (crosstalk). When the shaker table is shaken in the vertical direction, the crosstalk in the horizontal direction takes place. Possible causes of the crosstalk are believed to be a slight gap in a support mechanism of the shaker table, deterioration of the shaker over time, and the like. A vibration test device that suppresses the crosstalk has been proposed, for example, in Patent Document 1.

While the crosstalk of the shaker table is mechanically inevitable, the crosstalk may gradually increase with deterioration of the shaker over time. The crosstalk, when increases beyond a certain level, may harm the accuracy of the vibration test. Further, continuous use of the shaker without maintenance while the crosstalk of the shaker table has increased, may lead to a failure of the shaker.

CITATION LIST

Patent Document

PATENT DOCUMENT1: Japanese Unexamined Patent Publication No. 2019-2731

SUMMARY OF THE INVENTION

Technical Problem

However, shaking the shaker table may cause not only the crosstalk but also vibration in the rotational direction in the shaker table. For example, shaking the shaker table in the vertical axis direction (Z-axis direction) may lead not only to the crosstalk in the horizontal direction (X-axis direction, Y-axis direction), but also to vibration in a rotational direction about each of the X-axis, Y-axis, and Z-axis, in the shaker table.

That is, shaking the shaker table with the shaker may cause 6-degree of freedom motions (6DoF motions) of the shaker table, including vibration in the shaking direction. The 6DoF motions include a motion in the axial direction of each of three axes (X-axis, Y-axis, and Z-axis) orthogonal to one another and rotational motion around each of the X-axis, Y-axis, and Z-axis. The 6DoF motions may take place in a vibration test device that shakes the shaker table in only one axial direction (e.g., the Z-axis direction), or may take place in a multi-axis vibration test device that shakes the shaker table in a plurality of directions (e.g., the X-axis, the Y-axis, and the Z-axis directions).

Each 6DoF motion of the shaker table is considered as to take place due to various factors. For example, the 6DoF motion takes place in the shaker table due to various factors including deterioration of the support mechanism of the shaker table or the shaker over time, the case where the center of gravity of the test piece held on the shaker table is positioned off the shaking axis of the shaker, and the like. The 6DoF motions may gradually increase due to deterioration over a long period of time or may rapidly increase within a short period of time during a vibration test.

While it is not easy to completely suppress the 6DoF motion, an increase in the 6DoF motion of the shaker table beyond a certain level may affect the accuracy of the vibration test. Further, in a case where the 6DoF motion takes place as a sign of failure in the vibration test device, continuous usage without maintenance may lead to failure of the vibration test device. Further, when the center of gravity of the test piece is positioned off the shaking axis of the shaker, shaking at a high acceleration while the center of gravity being off the position may lead to a failure of the vibration test device.

The 6DoF motion of the shaker table is a phenomenon that could affect the accuracy of the vibration test and lead to a failure of the vibration test device, as described hereinabove. However, detecting the crosstalk does not detect rotational motions about axes, because the rotational motions about the axis and the crosstalk, out of the 6DoF motions of the shaker table, are different in their directions of motion. Therefore, evaluation based on only detection of the crosstalk taking place in the shaker table does not take into account the evaluation of the rotational motions about axes, which makes accurate evaluation related to the failure of the vibration test device difficult.

Further, the 6DoF motions of the shaker table take place due to various factors. Therefore, even if a 6DoF motion of the shaker table is detected, it is difficult to accurately perform evaluation related to the failure of the vibration test device, based only on the 6DoF motion of the shaker table.

In view of the above-described challenges, it is an object of the present invention to provide a vibration test device capable of accurately performing self-diagnosis related to the state of the vibration test device, including a failure determination, a failure prediction, and a performance limit determination of the vibration test device.

Solution to the Problem

The present invention adopts following configurations to solve the above problems. Namely, a vibration test device of the present invention is a vibration test device including a shaker configured to shake a shaker table, comprising: a drive controller configured to control drive of the shaker by controlling current and voltage applied to the shaker; a current detector configured to detect the current that controls vibration of the shaker; a voltage detector configured to detect the voltage that controls vibration of the shaker: a motion detector configured to detect physical quantities related to a motion of the shaker table; and a determiner configured to perform determination related to a state of the vibration test device, including a failure determination, a failure prediction, and a performance limit determination, based on detection signals output from the current detector, the voltage detector, and the motion detector (first configuration).

The failure determination herein means a determination that a failure has taken place in any component of the vibration test device, including a determination that the shaker has failed. The failure prediction means a determination that the probability of failure taking place in any component of the vibration test device is increasing, including a determination that the probability of a failure taking place in the shaker is increasing. The performance limit determination means a determination that any component of the vibration test device has reached its limit, including a determination that the performance of the shaker has reached its limit (the frequency, amplitude, acceleration, weight of the test piece, and the like tolerable by the shaker).

In the above configuration, the determiner performs determination related to a state of the vibration test device, including a failure determination, a failure prediction, and a performance limit determination, based on detection signals output from the current detector, the voltage detector, and the motion detector. Therefore, the vibration test device is able to accurately perform self-diagnosis related to the state of the vibration test device, including a failure determination, a failure prediction, and a performance limit determination. Accordingly, the vibration test device can be stopped at an early stage, when a failure is determined as to have taken place, and when a failure is predicted, the failure can be avoided by performing maintenance of the vibration test device at an early stage. Further, since the vibration test can be performed while confirming the state of the vibration test device, the vibration test can be performed with the vibration test device in a good condition, thus stabilizing the quality of the vibration test.

As a specific configuration of the vibration test device of the present invention, there are following configurations. The first configuration may further include a motion calculation unit configured to calculate physical quantities related to a 6DoF motion of the shaker table, based on the detection signal output from the motion detector, and the determiner may determine the state of the vibration test device, taking into account the physical quantities of the 6DoF motion calculated by the motion calculation unit (second configuration).

In the above configuration, the determiner determines the state of the vibration test device, taking into account the physical quantities of the 6DoF motion calculated by the motion calculation unit. By adding evaluation related to the 6DoF motion of the shaker table, the vibration test device is able to accurately perform self-diagnosis related to the state of the vibration test device, including a failure determination, a failure prediction, and a performance limit determination.

The second configuration may further include a motion storage configured to store a history of physical quantities related to the 6DoF motion calculated by the motion calculation unit, and the determiner may determine the state of the vibration test device, taking into account the history of the physical quantities of the 6DoF motion stored in the motion storage (third configuration).

In the above configuration, the determiner determines the state of the vibration test device, taking into account the history of the physical quantities of the 6DoF motion stored in the motion storage. Therefore, it is possible to evaluate changes and the like over time of the 6DoF motion of the shaker table, and accurately perform self-diagnosis related to the state of the vibration test device, including a failure determination, a failure prediction, and a performance limit determination of the vibration test device.

In the second or third configuration, the determiner, when any physical quantity related to a motion in a direction other than a shaking direction of the shaker, out of the physical quantities of the 6DoF motions, exceeds a predetermined threshold value, may determine at least any of a state where a failure has taken place in the vibration test device, a state where a probability of a failure taking place in the vibration test device is rising, or a state where the vibration test device has reached its performance limit (fourth configuration).

In the above configuration, of the physical quantities related to a 6DoF motion, if a physical quantity related to any motion in a direction other than a shaking direction of the shaker (i.e., crosstalk and rotational motion of the shaker table) exceeds a predetermined threshold value, it is highly likely that a failure has taken place in the vibration test device, that the probability of a failure taking place in the vibration test device is rising, or that the vibration test device has reached its performance limit, and determinations can be performed for these states.

Any one of the second to fourth configurations may further include a transmission rate calculation unit configured to calculate a transmission rate between the 6DoF motion of the shaker table and the current and voltage, based on the physical quantities related to the 6DoF motion of the shaker table, and detection signals output from the current detector and the voltage detector, and the determiner may determine the state of the vibration test device, taking into account the transmission rate calculated (fifth configuration).

In the above configuration, the determiner determines the state of the vibration test device, taking into account the transmission rate between the 6DoF motion of the shaker table and the current and voltage. Thus, for a failure and a performance limit of the vibration test device that may be attributed to various causes, it is possible to accurately perform self-diagnosis related to the state of the vibration test device, including a failure determination, a failure prediction, and a performance limit determination, by adding the transmission rate in addition to the 6DoF motion of the shaker table.

The fifth configuration may further include a transmission rate storage configured to store a history of transmission rates calculated by the transmission rate calculation unit, and the determiner may determine the state of the vibration test device, taking into account the history of the transmission rate stored in the transmission rate storage (sixth configuration).

In the above configuration, the determiner determines the state of the vibration test device, taking into account the history of the transmission rate stored in the transmission rate storage. Therefore, it is possible to evaluate changes and the like over time in the transmission rate, and accurately perform self-diagnosis related to the state of the vibration test device, including a failure determination, a failure prediction, and a performance limit determination of the vibration test device.

In the fifth or sixth configuration, the determiner, when any transmission rate calculated based on the physical quantities related to a motion in a direction other than a shaking direction of the shaker, out of the transmission rates, exceeds a predetermined threshold value, may determine at least any of a state where a failure has taken place in the vibration test device, a state where a probability of a failure taking place in the vibration test device is rising, or a state where the vibration test device has reached its performance limit (seventh configuration).

In the above configuration, of the transmission rates, if a transmission rate calculated based on a physical quantity related to any motion in a direction other than a shaking direction of the shaker (i.e., transmission rate calculated based on crosstalk or rotational motion of the shaker table) exceeds a predetermined threshold value, it is highly likely that a failure has taken place in the vibration test device, that the probability of a failure taking place in the vibration test device is rising, or that the vibration test device has reached its performance limit, and determinations can be performed for these states.

In any one of the fifth to seventh configurations, the determiner, when any transmission rate calculated based on physical quantities related to a motion in a shaking direction of the shaker, out of the transmission rates, falls short of a predetermined threshold value, may determine that the vibration test device has reached its performance limit (eighth configuration).

In the above configuration, any transmission rate calculated based on a physical quantity related to a motion in a shaking direction of the shaker, out of the transmission rates, falls short of a predetermined threshold value, performs a determination that the vibration test device has reached its performance limit, because it is highly likely that the vibration test device has reached its performance limit such as a case where, for example, the weight of the test piece is too great and desirable acceleration cannot be exerted.

In any one of the first to eighth configurations, the motion detector may include 3-axis acceleration sensors arranged in three or more positions of the shaker table apart from one another (ninth configuration).

In the above configuration, the motion detector includes 3-axis acceleration sensors arranged in three or more positions of the shaker table apart from one another. Therefore, physical quantities related to 6DoF motions of the shaker table can be calculated while minimizing the number of motion detectors arranged in the shaker table.

In any one of the first to ninth configurations, the determination related to the state of the vibration test device may further include either a determination related to estimation of a failed part of the vibration test device, or a determination related to the position of the center of gravity of a test piece held on the shaker table (tenth configuration).

In the above configuration, the determination related to the state of the vibration test device includes a determination related to estimation of a failed part of the vibration test device, or a determination related to the position of the center of gravity of a test piece held on the shaker table. Estimation of the failed part in the vibration test device makes maintenance easier. Further, the determination related to the position of the center of gravity of the test piece held on the shaker table allows easier and accurate installation of the test piece.

In any one of the first to tenth configurations, when the determiner determines that a failure takes place in the vibration test device, the drive controller may stop the shaker (eleventh configuration).

In the above configuration, the shaker is stopped, upon determining that a failure takes place in the vibration test device. Accordingly, the vibration test device can be safely stopped, when a failure takes place in the vibration test device.

Any one of the first to eleventh configurations may further include a communication unit configured to output, to a database connected via a network, a result of the determination by the determiner and data used for the determination by the determiner (twelfth configuration).

In the above configuration, the communication unit outputs, to a database connected via a network, a result of the determination by the determiner and data used for the determination by the determiner. Accordingly, self-diagnosis results of a plurality of vibration test devices and data related thereto can be accumulated in a database, and data accumulated can be used for improving the accuracy of the self-diagnosis.

In any one of the first to twelfth configurations, the threshold value used in the determination by the determiner is updatable, the threshold value is updated via the network connected to the communication unit (thirteenth configuration).

In the above configuration, the threshold value of the determiner is updated via the network connected to the communication unit. Therefore, it is possible to continuously improve the accuracy of the self-diagnosis of the vibration test device.

Advantages of the Invention

A vibration test device of the present invention is capable of accurately performing self-diagnosis related to the state of the vibration test device, including a failure determination, a failure prediction, and a performance limit determination of the vibration test device.

BRIEF DESCRIPTION OF THE DRAWINGS

FIG. 1 is a diagram showing a configuration of a vibration test device according to the first embodiment of the present invention.

FIG. 6 is a graph showing an exemplary history of transmission rates with respect to rotation around an axis, out of the 6DoF motions.

FIG. 7A is a diagram showing an exemplary display screen reporting a determination result related to the state of the vibration test device.

FIG. 7B is a diagram showing an exemplary display screen reporting a determination result related to the state of the vibration test device.

FIG. 7C is a diagram showing an exemplary display screen reporting a determination result related to the state of the vibration test device.

FIRST EMBODIMENT

Figure 2:
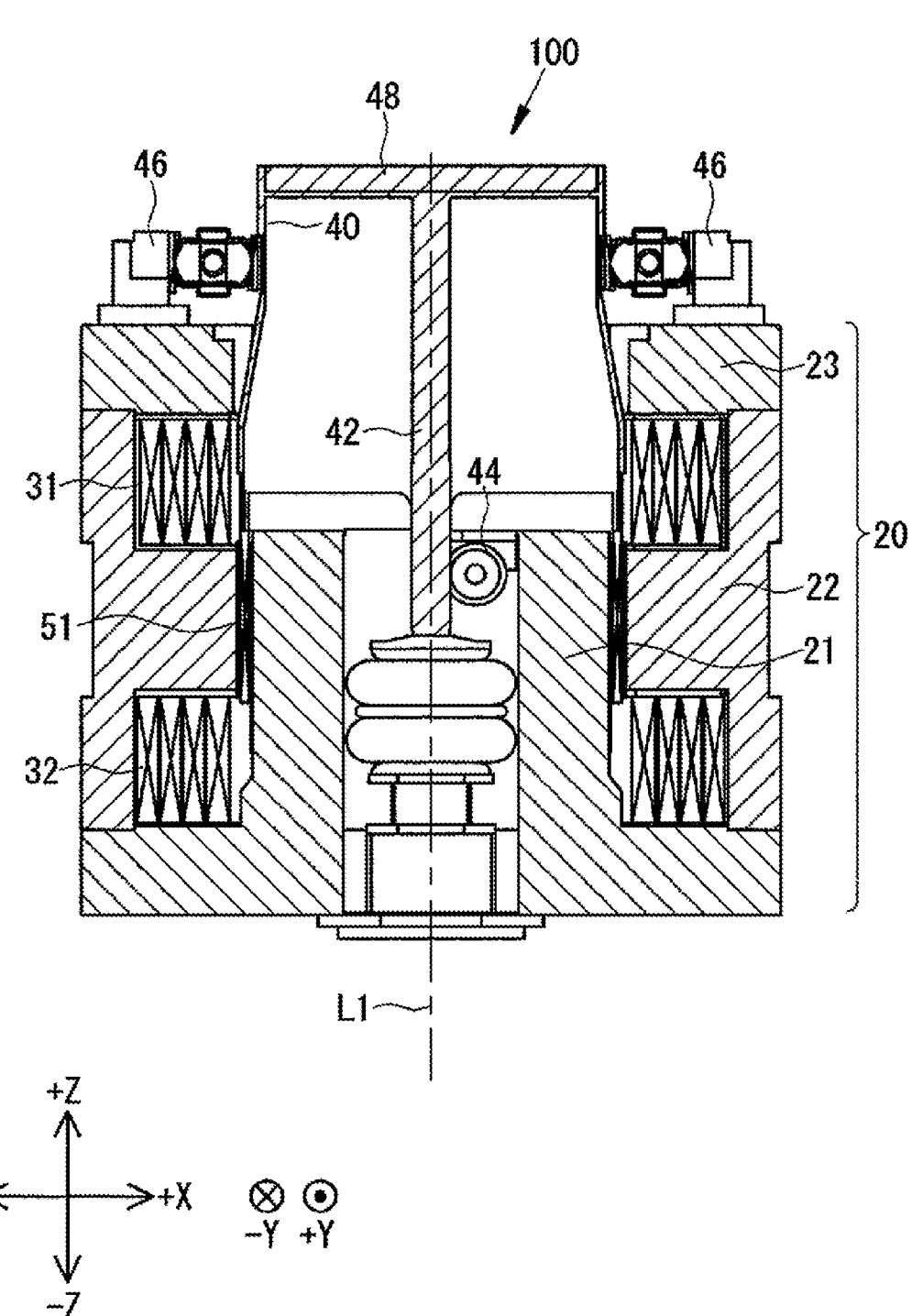
FIG. 2 is a cross-sectional view of a shaker taken along a shaking axis.

The following details a vibration test device 200 according to the first embodiment of the present invention, with reference to the drawings. In the drawings, the same reference characters are given to parts that are identical or equivalent to one another, and description for such parts are not repeated. It should be noted that configurations illustrated in the drawings referred to in the following description are simplified, schematized, or omit some constituting members, for the sake of easier understanding. Further, the dimensional ratios between components shown in each figure are not necessarily indicative of actual dimensional ratios.

[Overall Configuration]

Figure 1:
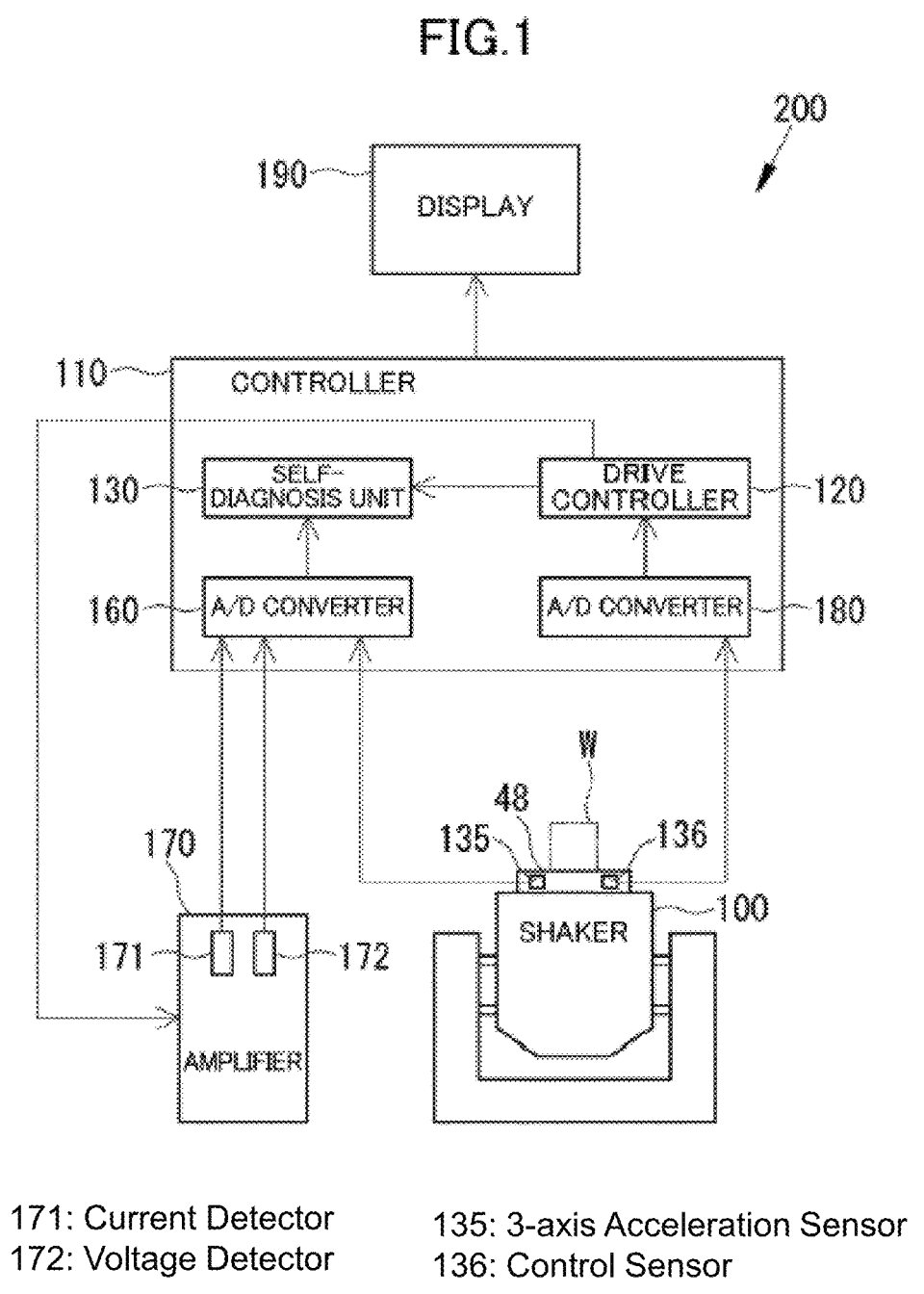

FIG. 1 is a diagram showing a configuration of a vibration test device 200 according to the first embodiment of the present invention. As illustrated in FIG. 1, the vibration test device 200 includes a shaker 100, a controller 110, an amplifier 170, a display 190, and the like.

The shaker 100 has a shaker table 48, and a test piece W is held on this shaker table 48. The vibration test is performed by vibrating the shaker table 48 while a test piece W is held on the shaker table 48. To this shaker table 48, a 3-axis acceleration sensor 135 and a control sensor 136 are arranged.

The controller 110 controls driving of the shaker 100. The controller 110 has a drive controller 120 and a self-diagnosis unit 130.

The drive controller 120 controls driving of the shaker 100 by controlling the current and voltage applied to the shaker 100, so as to vibrate the test piece W at a desirable frequency, amplitude, acceleration, vibration pattern, and the like as required in the vibration test. A control signal output from the drive controller 120 is input to the shaker 100 via the amplifier 170. A detection signal from the control sensor 136 provided to the shaker table 48 is input to the drive controller 120 via an A/D converter 180, to determine whether the vibration (response vibration) generated by the shaker 100 meets the necessary desirable vibration (targeted vibration) and to reflect the determination result to the control signal from the drive controller 120.

The self-diagnosis unit 130 performs a determination related to the state of the vibration test device 200 including a failure determination, a failure prediction, and a performance limit determination of the shaker 100. Specifically, the self-diagnosis unit 130 performs a determination related to the state of the vibration test device 200 based on a 6DoF motion of the shaker table 48 calculated based on an input from the 3-axis acceleration sensor 135, the detection signals from the current detector 171 and a voltage detector 172, and the like.

The 3-axis acceleration sensor 135 detects physical quantities related to vibration of the shaker table 48, and the detection signals are input to the self-diagnosis unit 130 via an A/D converter 160. The 6DoF motion of the shaker table 48 is calculated based on the physical quantities detected by the 3-axis acceleration sensor 135.

The current detector 171 and the voltage detector 172 are arranged in the amplifier 170. The current detector 171 detects the current that controls the vibration of the shaker 100. The voltage detector 172 detects the voltage that controls the vibration of the shaker 100. The detection signals from the current detector 171 and the voltage detector 172 are input to the self-diagnosis unit 130 via the A/D converter 160.

The display 190 displays a setting screen related to vibration of the shaker 100, an operation state of the shaker 100, and a self-diagnosis result by the self-diagnosis unit 130. Input to the controller 110 is performed by using an input device such as a touch panel type display 190.

[Shaker]

Figure 3:
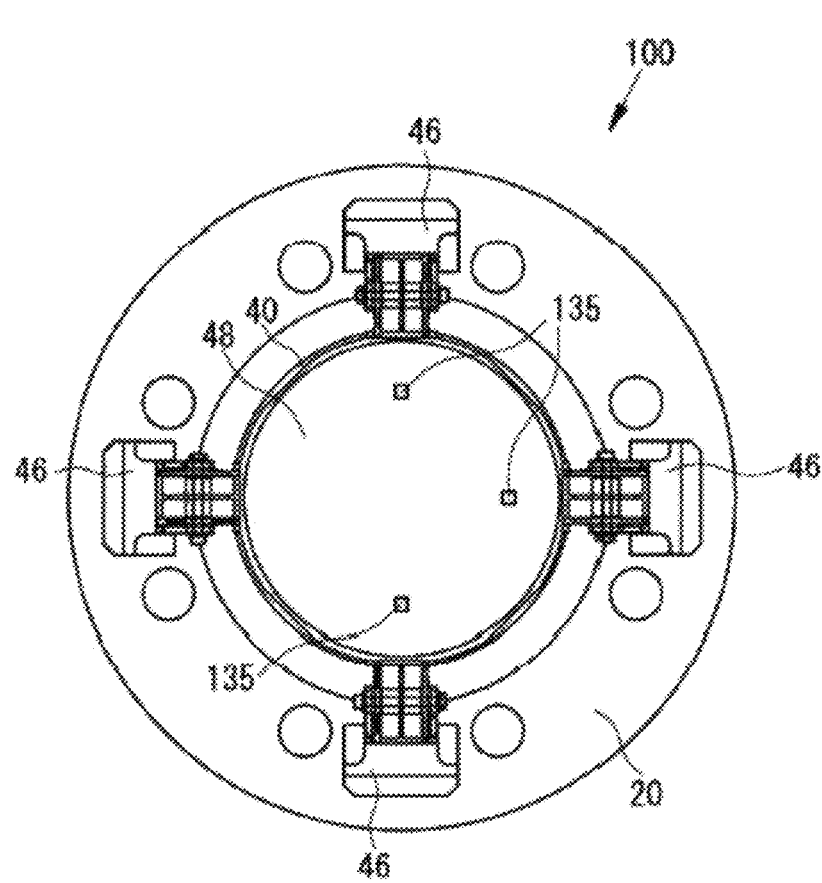
FIG. 3 is a plan view of the shaker of FIG. 1 as viewed in a direction from the positive side to the negative side of the Z-axis direction.
Figure 3:
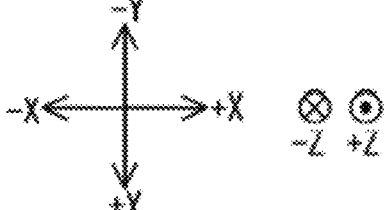

Next, the configuration of the shaker 100 is described. FIG. 2 is a cross-sectional view of the shaker 100 taken along a shaking axis L1. FIG. 3 is a plan view of the shaker 100 of FIG. 1 as viewed in a direction from the positive side to the negative of the Z-axis direction. The present embodiment assumes that the Z-axis direction is a vertical direction (orthogonal direction), the Y-axis direction is a horizontal direction, and the X-axis direction is a direction perpendicular to a YZ plane.

As illustrated in FIG. 2, the shaker 100 is an electrodynamic shaker arranged so that its shaking axis L1 is parallel to the Z-axis direction, and is configured to generate vibration in the Z-axis direction. The shaker 100 includes a yoke 20, excitation coils 31, 32, a cylinder 40, a drive coil 51, and the like.

The yoke 20 is configured by integrally combining a first yoke part 21, a second yoke part 22, and a third yoke part 23. The excitation coils 31, 32 are attached to the inner circumferential surface of the second yoke part 22. The excitation coils 31, 32 are each wound in a cylindrical shape, and are attached side by side, apart from each other in the direction of the shaking axis L1. Between the outer circumferential surface of the first yoke part 21 and the inner circumferential surface of the second yoke part 22, a magnetic circuit and a magnetic gap are formed by the static magnetic field formed by the excitation coils 31, 32.

The cylinder 40 is a part housed inside the yoke 20 and movable with respect to the yoke 20. Inside the cylinder 40, a guide shaft 42 extends in the Z-axis direction. Around the guide shaft 42, guide rollers 44 that guide the guide shaft 42 in the Z-axis direction are arranged at three positions at intervals of 120 degrees. Each of the guide rollers 44 is supported on the inner wall surface of the first yoke part 21. One end side (the positive side in the Z-axis direction) of the cylinder 40 protrudes with respect to the yoke 20, and is supported by support devices 46 so as to be guided in the Z-axis direction.

The drive coil 51 is a coil arranged in the magnetic gap for generating vibration. The drive coil 51 is wound around the outer circumferential surface of the other end portion (the negative side in the Z-axis direction) of the cylinder 40. The drive coil 51 is inserted so as not to contact the excitation coils 31, 32 and the yoke 20, in a magnetic gap between the excitation coils 31, 32 and the yoke 20 (the first yoke part 21 and the second yoke part 22).

By supplying a direct current from the drive controller 120 (see FIG. 1) to the excitation coils 31, 32 via the amplifier 170, a magnetic circuit (static magnetic field) is generated in the yoke 20 surrounding the excitation coils 31, 32. Further, by supplying an alternating current of a predetermined frequency from the drive controller 120 to the drive coil 51 via the amplifier 170, interaction between the static magnetic field generated in the magnetic gap and the alternating current supplied to the drive coil 51 causes the drive coil 51 to slide in a direction perpendicular to the magnetic flux. Specifically, according to the direction of the current flowing in the drive coil 51, the drive coil 51 and the cylinder 40 repetitively slides in a direction of advancing (forward) outward from the yoke 20 (in the direction towards the positive side of the Z-axis direction) and slides in a direction of withdrawing (retracting) inward to the yoke 20 (in the direction towards the negative side of the Z-axis direction). That is, the drive coil 51 and the cylinder 40 (movable part) vibrate along the Z-axis direction with respect to the yoke 20 (fixed part), according to the frequency of the alternating current supplied to the drive coil 51.

On the other end side (the positive side in the Z-axis direction) of the cylinder 40, the shaker table 48 is provided. On the shaker table 48, the test piece W is held. With this shaker 100, the drive coil 51, the cylinder 40, and the shaker table 48 integrally vibrates along the Z-axis direction to shake the test piece W in the Z-axis direction, by driving the shaker 100 with a direct current and an alternating current supplied from the drive controller 120.

As illustrated in FIG. 3, the support devices 46 are each arranged between the cylinder 40 that reciprocates in the Z-axis direction and an end portion of the yoke 20 (the third yoke part 23) arranged around the cylinder 40.

To the shaker table 48, a plurality of 3-axis acceleration sensors 135 are provided. Each of the 3-axis acceleration sensors 135 is a sensor capable of detecting acceleration in directions of 3 axes perpendicularly crossing one another. By detecting the accelerations in the directions of the 3 axes at three or more separate positions, it is possible to calculate the 6DoF motion of the shaker table 48 based on the detection signals. In the present embodiment, the 3-axis acceleration sensors 135 are disposed at three positions of the shaker table 48, which positions are separate from one another, respectively. Each of the 3-axis acceleration sensors 135 is arranged so that the directions of its perpendicularly-crossing 3 axes along which the 3-axis acceleration sensor 135 is able to detect the acceleration are aligned with the X-axis, Y-axis, and Z-axis, respectively, in one preferred embodiment.

It should be noted that the sensor provided to the shaker table 48 is not limited to the 3-axis acceleration sensor, as long as the physical quantities related to the motion of the shaker table 48 are detected and, based on the detection signals, the physical quantities of the 6DoF motions of the shaker table 48 are calculated. For example, various sensors, such as 1-axis acceleration sensor and 2-axis acceleration sensor, may be combined to detect the physical quantities necessary to calculate the 6DoF motions. Further, the position of arranging sensor is not particularly limited provided that, if the sensor is an acceleration sensor, the acceleration of the shaker table 48 is detectable.

[Self-Diagnosis System]

Figure 4:
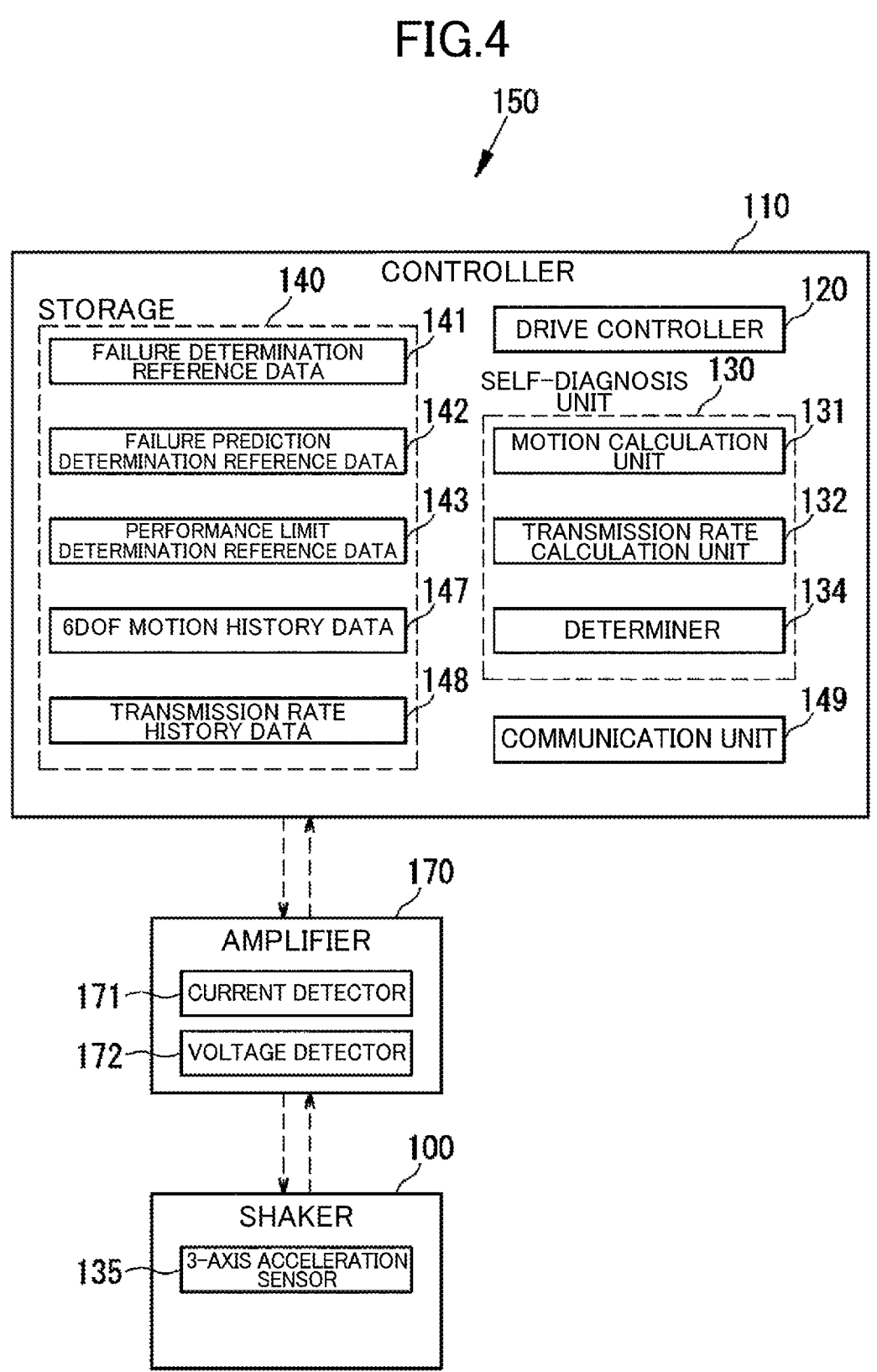
FIG. 4 is a schematic diagram showing a configuration of a self-diagnosis system.

FIG. 4 is a schematic diagram showing a configuration of a self-diagnosis system 150. The self-diagnosis system 150 is a system configured to perform self-diagnosis regarding the state of the vibration test device 200 including the failure determination, the failure prediction, and the performance limit determination of the shaker 100.

The determination by the self-diagnosis system 150 includes a determination based on the current operating state and a determination based on a result of comparison between the current operating state and the history of the past operating state. Further, the determination based on comparison with the past operating state includes determinations of various time frames. For example, the determination includes a determination for a long time frame, which is based on a history from the time of introducing the vibration test device 200, and a determination for a short time frame, which is based on a history from the start of the currently-executed vibration test to the current time point. Further, the self-diagnosis system 150 executes self-diagnosis not only at the time of maintenance of the vibration test device 200, but also while the vibration test device 200 is operated, including the time during the vibration test.

The self-diagnosis system 150 includes the controller 110, the amplifier 170, and the shaker 100.

The controller 110 has a drive controller 120, the self-diagnosis unit 130, a storage 140, and a communication unit 149.

The drive controller 120 controls the drive of the shaker 100 by controlling the current and voltage applied to the shaker 100. Further, the drive controller 120 also performs control such as stopping the driving of the shaker 100 according to the determination result by the self-diagnosis unit 130.

The self-diagnosis unit 130 performs a determination related to the state of the vibration test device 200 including a failure determination, a failure prediction, and a performance limit determination of the shaker 100. The self-diagnosis unit 130 has a motion calculation unit 131, a transmission rate calculation unit 132, and a determiner 134.

The motion calculation unit 131 calculates the physical quantities related to a 6DoF motion of the shaker table 48, based on the detection signals output from the plurality of 3-axis acceleration sensors 135 provided to the shaker table 48. The 6DoF motions include a motion in the axial direction of each of three axes (X-axis, Y-axis, and Z-axis) orthogonal to one another and rotational motion around each of the X-axis, Y-axis, and Z-axis. The physical quantities related to the 6DoF motion are the quantities of the 6DoF motion described in the form of displacement, velocity, acceleration, rotational angle, angular velocity, and angular acceleration. The present embodiment deals with a case of detecting, as the physical quantities related to the 6DoF motion of the shaker table 48, accelerations in axial directions of X-axis, Y-axis, and Z-axis, and accelerations about each of the X-axis, Y-axis, and Z-axis.

The transmission rate calculation unit 132 calculates a transmission rate between the 6DoF motion of the shaker table 48 and the current and voltage, based on the physical quantities related to the 6DoF motion of the shaker table 48 calculated by the motion calculation unit 131 and the detection signals output from the current detector 171 and the voltage detector 172. The present embodiment deals with a case of using, as the physical quantities related to the 6DoF motion of the shaker table 48 used for calculation of the transmission rate, accelerations in axial directions of X-axis, Y-axis, and Z-axis, and accelerations about each of the X-axis, Y-axis, and Z-axis.

Here, the transmission rate for the acceleration and the current and the transmission rate for the acceleration and the voltage are calculated as follows, assuming that the acceleration of the shaker table 48 in the shaking direction (Z-axis direction) is A, the detection signal (the current value applied to the shaker 100) output from the current detector 171 is I, and the detection signal (voltage value applied to the shaker 100) output from the voltage detector 172 is E.

Transmission rate for acceleration and current in the shaking direction=A/I

Transmission rate for acceleration and voltage in the shaking direction=A/E

Further, the transmission rate for the acceleration and the current and the transmission rate for the acceleration and the voltage are calculated as follows, assuming that the acceleration of the shaker table 48 in each direction other than the shaking direction (Z-axis direction) is B, the detection signal (the current value applied to the shaker 100) output from current detector 171 is I, and the detection signal (voltage value applied to the shaker 100) output from the voltage detector 172 is E.

Transmission rate for acceleration and current in a direction other than the shaking direction=B/I Transmission rate for acceleration and voltage in a direction other than the shaking direction=B/E Note that B is acceleration other than the acceleration in the Z-axis direction, that is the acceleration in each of the X-axis and Y-axis directions, and acceleration around each of the X-axis, Y-axis, and Z-axis.

Since the above transmission rate is calculated based on the acceleration of the 6DoF motion of the shaker table 48, the current value applied to the shaker 100, and the voltage value applied to the shaker 100, the transmission rate can be calculated even if the weight of the test piece W held on the shaker table 48 is unknown. It is further possible to perform a determination related to the state of the vibration test device 200 with the transmission rate calculated.

The determiner 134 performs a determination related to the state of the vibration test device 200 including the failure determination, the failure prediction, and the performance limit determination, based on the detection signals output from the current detector 171, the voltage detector 172, and the 3-axis acceleration sensor 135.

For example, the determiner 134 determines the state of the vibration test device 200 by using both the acceleration of the 6DoF motion of the shaker table 48 calculated by the motion calculation unit 131, and the transmission rate calculated by the transmission rate calculation unit 132. Further, for example, the determiner 134 determines the state of the vibration test device 200 by using both the history of the acceleration of the 6DoF motion, that is, changes in the acceleration of the 6DoF motion over time, and history of the transmission rate, that is, changes in the transmission rate over time. A specific determination by the determiner 134 is detailed later.

The storage 140 stores data related to the determination of the state of the vibration test device 200. The storage 140 stores failure determination reference data 141, failure prediction determination reference data 142, performance limit determination reference data 143, 6DoF motion history data 147, and transmission rate history data 148.

The failure determination reference data 141 is determination reference related to the failure of the vibration test device 200, and for example, is determination reference data for determining whether a failure is taking place in the shaker 100. Specifically, for example, for the transmission rate (A/I) for the acceleration and the current in the shaking direction, the transmission rate (A/E) for the acceleration and the voltage in the shaking direction, the transmission rate (B/I) for the acceleration and the current in a direction other than the shaking direction, and the transmission rate (B/E) for the acceleration and the voltage in a direction other than the shaking direction, the data includes threshold values referred to when determining that a failure has taken place in the shaker 100.

The failure prediction determination reference data 142 is determination reference related to failure prediction of the vibration test device 200, and for example, is determination reference data for determining the probability of a failure taking place in the shaker 100. Specifically, for example, for the transmission rate (A/I) for the acceleration and the current in the shaking direction, the transmission rate (A/E) for the acceleration and the voltage in the shaking direction, the transmission rate (B/I) for the acceleration and the current in a direction other than the shaking direction, and the transmission rate (B/E) for the acceleration and the voltage in a direction other than the shaking direction, the data includes probabilities of a failure taking place in the shaker 100 and threshold values referred to when determining a failure takes place at the probability.

The performance limit determination reference data 143 is determination reference related to the performance limit determination for the vibration test device 200, and for example, is determination reference data for determining that driving of the shaker 100 has reached its performance limit. Specifically, for example, for the transmission rate (A/I) for the acceleration and the current in the shaking direction, the transmission rate (A/E) for the acceleration and the voltage in the shaking direction, the transmission rate (B/I) for the acceleration and the current in a direction other than the shaking direction, and the transmission rate (B/E) for the acceleration and the voltage in a direction other than the shaking direction, the data includes threshold values referred to when determining that the driving of the shaker 100 has reached its performance limit.

The 6DoF motion history data 147 is data related to the history of the physical quantities of a 6DoF motion calculated by the motion calculation unit 131. For example, when the acceleration of the 6DoF motion is calculated by the motion calculation unit 131, the calculation result is accumulated as the 6DoF motion history data 147 in the storage 140.

The transmission rate history data 148 is data related to the history of the transmission rate calculated by the transmission rate calculation unit 132. When the transmission rate is calculated by the transmission rate calculation unit 132, the calculation result is accumulated as the transmission rate history data 148 in the storage 140.

It should be noted that the self-diagnosis system 150 is not limited to the above-described configuration. For example, a sensor that detects physical quantities inside and outside the shaker 100 may be further provided. For example, as the sensor that detects physical quantities inside the shaker 100, a temperature sensor that detects exhaust temperature from the shaker 100 may be provided. Further, as the sensor that detects physical quantities outside the shaker 100, a temperature sensor that detects ambient temperature around the shaker 100 may be provided.

Instead of evaluating the state of the vibration test device 200 only from the physical quantities of the 6DoF motion of the shaker table 48 calculated by the motion calculation unit 131 and the transmission rate calculated by the transmission rate calculation unit 132, the determiner 134 may evaluate the state of the vibration test device 200 by also using other physical quantities. Further, for example, another function such as a coherence function may be used to evaluate the state of the vibration test device 200.

The determination result given by the determiner 134 is reported to an operator of the vibration test device 200 in the form of display on the display 190 (see FIG. 1) or through audio output.

The communication unit 149 outputs the determination result from the determiner 134 and data used for the determination by the determiner 134 to a cloud server (not shown) connected via a network.

To the network, a plurality of vibration test devices 200 are connected, and the cloud server may include a machine learning device that learns the determination related to the state of each vibration test device 200 including the failure determination, the failure prediction, and the performance limit determination. The machine learning device may output a learning result to the vibration test device 200 connected to the network. The self-diagnosis system 150 of the vibration test device 200 may be capable of updating the determination reference data referred to at a time of the determination, and may update the determination reference data according to the learning results output from the machine learning device. In this case, the self-diagnosis results from a plurality of vibration test devices 200 can be used for improving the accuracy of self-diagnosis, and by reflecting the learning results by the machine learning device on the vibration test devices 200, the accuracy of the self-diagnosis can be continuously improved.

[Evaluation Items]

Next, the following describes exemplary evaluation items used for determination related to the state of the vibration test device 200 and an exemplary determination result.

Figure 5:
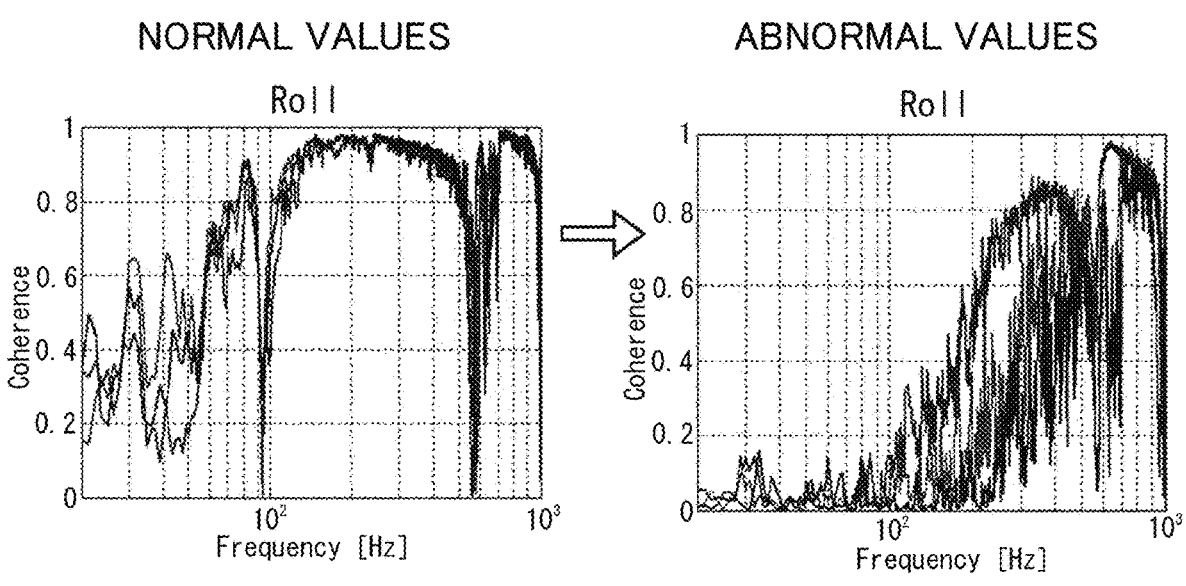
FIG. 5 is a graph showing an exemplary change in coherence with respect to rotation around an axis, out of 6DoF motions.

FIG. 5 is a graph showing an exemplary change in coherence with respect to rotation around an axis, out of 6DoF motions. Variation in the coherence is one of the evaluation items used in a determination related to the state of the vibration test device 200. In FIG. 5, values in a normal state of the shaker 100 are shown on the left side, and values while an abnormality takes place in the shaker 100 are shown on the right side of the same figure. The horizontal axis of each graph represents the frequency of vibration, and the vertical axis represents the value of coherence. FIG. 5 shows the linearity of rotation (output) about the axis with respect to the current (input) supplied to the shaker 100. The closer the coherence value is to 1, the more linear it is at that frequency.

Regarding the normal values on the left side figure, the coherence is not 1 throughout the entire frequency area, and there is an area with high linearity (area relatively close to 1) and an area with low linearity (area relatively far from 1), depending on the frequencies. Such a relationship between the frequency and the coherence is a characteristic different for each shaker 100. Therefore, it cannot be determined that an abnormality has occurred in the shaker 100 only because the coherence falls below a predetermined value (for example, 0.5). A history of the coherence calculated while the vibration test device 200 is operated is accumulated in the storage 140.

In the shaker 100 having a characteristic as shown in the left side figure, a frequency area with low linearity may increase as shown in the right side figure when, for example, deterioration over time progresses. While it is difficult to accurately determine the state of the shaker 100 from the coherence value alone at one point, but adding the change in the coherence over time stored in the storage 140 to the evaluation items for the determination, the determiner 134 is able to improve the accuracy of determining the state of the vibration test device 200 including the failure determination, the failure prediction, and the performance limit determination of the shaker 100.

Figure 6:
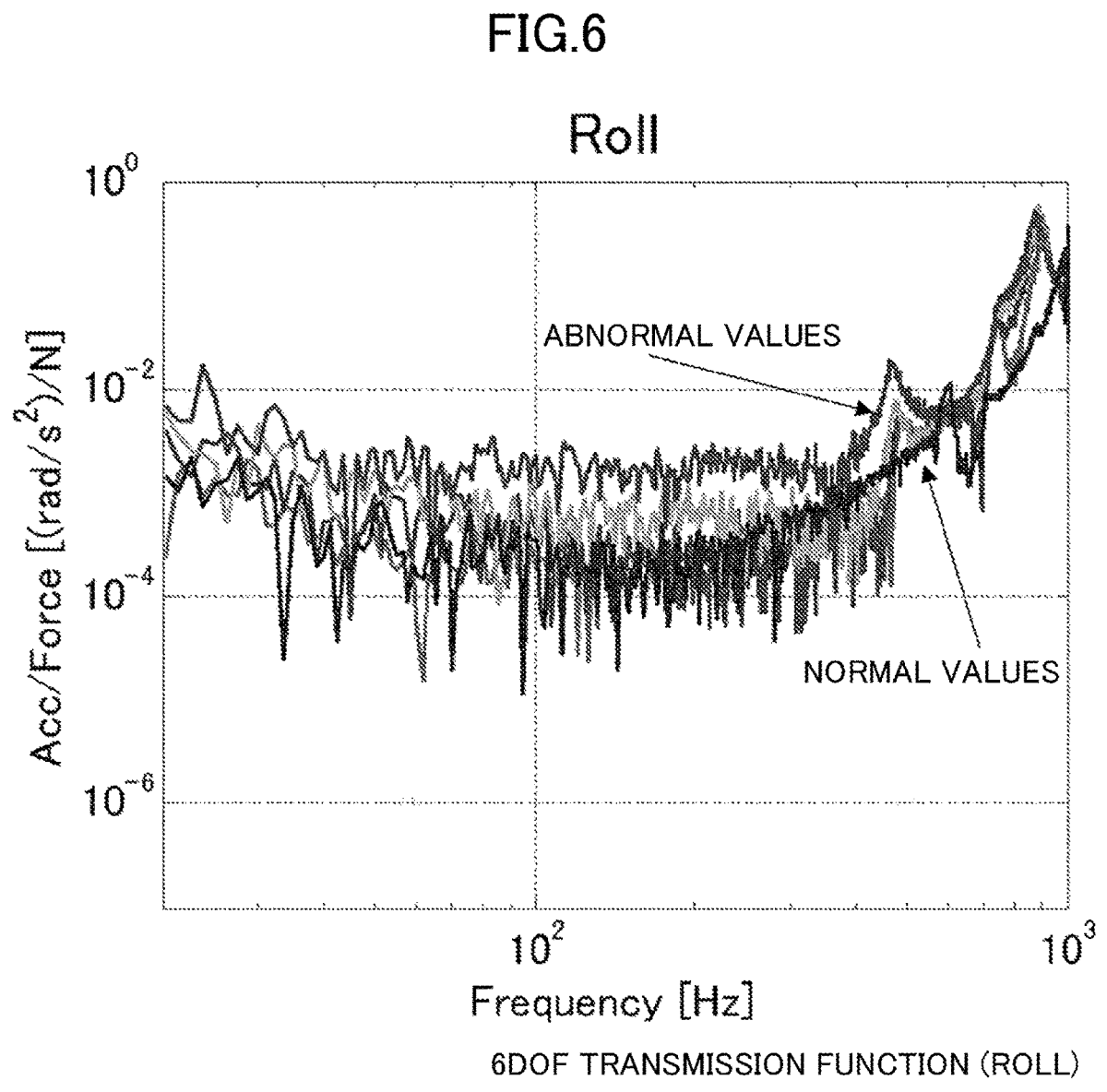

FIG. 6 is a graph showing an exemplary history of transmission rates with respect to rotation around an axis, out of the 6DoF motions. Of the 6DoF motion of the shaker table 48, the history of the transmission rates related to a motion in a direction other than the shaking direction is one of the evaluation items used in a determination related to the state of the vibration test device 200. The horizontal axis of the graph represents the frequency of vibration, and the vertical axis represents the transmission rate. FIG. 6 shows a plurality of graph lines and each graph line represents a relationship between the transmission rate and the frequency at a time point. The graph indicated as the normal values in FIG. 6 represents the relationship between the transmission rate and the frequency while the shaker 100 is in the normal state. The graph indicated as the abnormal values represents the relationship between the transmission rate and the frequency while an abnormality takes place in the shaker 100.

The transmission rate related to the rotation about the axis is not constant even in the normal state, and there is an area with high the transmission rates an area with low transmission rates depending on the frequencies. Such a relationship between the frequency and the transmission rate is a characteristic different for each shaker 100. A history of the transmission rate calculated while the vibration test device 200 is operated is accumulated in the storage 140.

In the shaker 100 having a characteristic as shown in the graph indicated as to be the normal values, the transmission rate related to motions other than a motion in the shaking direction may increase as shown in the graph indicated as the abnormal values when, for example, deterioration over time progresses. Adding the change in the transmission rate over time stored in the storage 140 to the evaluation items and perform a determination by taking into account the history of the transmission rates, the determiner 134 is able to improve the accuracy of determining the state of the vibration test device 200 including the failure determination, the failure prediction, and the performance limit determination of the shaker 100.

[Determination]

The following describes an exemplary determination by the determiner 134.

[Determination Based on 6DoF Motion]

Of the 6DoF motions of the shaker table 48, for example, an increase beyond a certain level in the acceleration other than the acceleration in the shaking direction of the shaker 100 may affect the accuracy of the vibration test. Further, in a case where the 6DoF motions take place as a sign of failure in the shaker 100, continuous usage without maintenance may lead to failure of the shaker 100. Further, when the center of gravity of the test piece W is positioned off the shaking axis of the shaker 100, shaking at a high acceleration while the center of gravity being off the position may lead to a failure of the shaker 100.

Therefore, for example, when any acceleration other than the acceleration in the shaking direction of the shaker 100 out of the 6DoF motions exceeds a predetermined threshold value stored as the failure determination reference data 141, the failure prediction determination reference data 142, and the performance limit determination reference data 143, the determiner 134 may determine at least any of a state where a failure has taken place in the shaker 100, a state where a probability of a failure taking place in the shaker 100 is rising, or a state where the shaker 100 has reached its performance limit. Further, the determination related to failure may include a determination related to estimation of a failed part in the shaker 100.

Further, since there is a possibility that no failure takes place in the shaker 100 but there is a problem related to the setting of the test piece W such that the center of gravity of the test piece W is off the shaking axis of the shaker 100, it is possible to include a determination that the center of gravity of the test piece W held on the shaker table 48 is off the shaking axis of the shaker 100.

When the determiner 134 determines that a failure takes place in the vibration test device 200, the drive controller 120 may perform control of stopping the shaker 100.

[Determination Based on Transmission Rate]

Although an acceleration B of the shaker table 48 in a direction other than the shaking direction (Z-axis direction) is small while the shaker 100 is in a normal state and the transmission rate B/I and the transmission rate B/E are therefore small, the transmission rate B/I and the transmission rate B/E tend to increase due to an increase in the acceleration B which is attributed to progressing deterioration over time of the shaker 100.

Therefore, for example, when any of the transmission rate B/I and the transmission rate B/E, out of the transmission rates, calculated based on an acceleration other than the acceleration in the shaking direction of the shaker 100 exceeds a predetermined threshold value stored as the failure determination reference data 141, the failure prediction determination reference data 142, and the performance limit determination reference data 143, the determiner 134 may determine at least any of a state where a failure has taken place in the shaker 100, a state where a probability of a failure taking place in the shaker 100 is rising, or a state where the shaker 100 has reached its performance limit. Further, the determination related to failure may include a determination related to estimation of a failed part in the shaker 100.

Further, since there is a possibility that no failure takes place in the shaker 100 but there is a problem related to the setting of the test piece W such that the center of gravity of the test piece W is off the shaking axis of the shaker 100, it is possible to include a determination that the center of gravity of the test piece W held on the shaker table 48 is off the shaking axis of the shaker 100.

When the determiner 134 determines that a failure takes place in the vibration test device 200, the drive controller 120 may perform control of stopping the shaker 100.

Meanwhile, the transmission rate (A/I) related to the acceleration in the shaking direction of the shaker 100 and the current and the transmission rate (A/E) related to the acceleration in the shaking direction and the voltage vary depending on the frequency, the amplitude, the acceleration, and the weight of the test piece W. Further, the transmission rate A/I and the transmission rate A/E in the shaking direction do not contain the weight of the test piece W. Therefore, for example, when the weight of the test piece W is great for the frequency, the amplitude, and the acceleration of the vibration to be added to the shaker 100, the transmission rate A/I and the transmission rate A/E in the shaking direction tend to become small.

Therefore, for example, when any of the transmission rate A/I and the transmission rate A/E in the shaking direction of the shaker 100 falls short of a predetermined threshold value stored as the failure determination reference data 141, the failure prediction determination reference data 142, and the performance limit determination reference data 143, the determiner 134 may determine that the shaker 100 has reached its performance limit.

[Reporting of Determination Result]

FIGS. 7A, 7B, and 7C are each a diagram showing an exemplary display screen reporting a determination result related to the state of the vibration test device 200. The self-diagnosis related to the state of the vibration test device 200 including the failure determination, the failure prediction, and the performance limit determination of the shaker 100 includes a determination based on the current operating state, a determination based on the short-term history of the operating state, and a determination based on the long-term history of the operating state.

FIG. 7A shows an exemplary determination result based on the current operating state. The determination result shown on this display screen is a determination result based on the current operating state. The display screen shows "Currently, 70% or More of Maximum Shaking Force" as an alert resulting from a real-time rating check, and reports the determination result of the performance limit determination of the shaker 100.

FIG. 7B shows an exemplary determination result based on the short-term history of the operating state. The determination result shown on this display screen is a short-term determination result based on a history from the beginning of the currently executed vibration test to the current time point. The display screen shows a warning "Drive Current increased from Beginning of Shaking. Abnormality in Drive Coil Suspected.", and reports the determination result of the failure determination or the failure prediction of the shaker

100 as well as the determination result related to estimation of failed part of the shaker 100. As a countermeasure, the display further shows "Please Stop the Shaking Immediately and Perform Inspection." and informs the operator of a specific measures to be taken.

FIG. 7C shows an exemplary determination result based on the long-term history of the operating state. The determination result shown on this display screen is a determination result based on a comparison of an operating state at a routine inspection (inspection date of 2020 Apr. 15) and the history of an operating state on a date of obtaining reference data (2020 Apr. 15). The display screen shows a warning "Drive Current increased from the Reference Value. Distortion Rate is Worsening. Abnormality in Drive Coil Suspected.", and reports the determination result of the failure determination or the failure prediction of the shaker 100 as well as the determination result related to estimation of failed part of the shaker 100. As a countermeasure, the display further shows "Please Stop the Device and Contact IMV Service" and informs the operator of a specific measures to be taken.

With the vibration test device 200 related to the present embodiment as described hereinabove, it is possible to accurately perform self-diagnosis related to the state of the vibration test device 200, including the failure determination, the failure prediction, and the performance limit determination of the vibration test device 200.

[Modification]

The embodiments disclosed here are illustrative in all respects and are not intended to be a basis for limiting interpretation. The technical scope of the present invention is not interpreted only by the above-described embodiments, but is defined based on the description of the claims. The technical scope of the present invention includes all modifications within the meaning and range equivalent to the scope of the claims.

The present embodiment deals with a vibration test device 200 having a shaker 100 shaking in one axial direction. However, the present invention may be applied to a multi-axial vibration test device such as 2-axial, or 3-axial vibration test device. Further, the configuration of the shaker table 48 is a mere example, and the shaker table may have other configurations.

INDUSTRIAL APPLICABILITY

The present invention is applicable to a vibration test device including a shaker configured to shake a shaker table and capable of performing self-diagnosis including a failure determination, a failure prediction, and a performance limit determination.

DESCRIPTION OF REFERENCE CHARACTERS

200 Vibration Test Device

100 Shaker

48 Shaker Table

120 Drive Controller

134 Determiner

135 3-Axis Acceleration Sensor (Motion Detector)

171 Current Detector

172 Voltage Detector

The invention claimed is:

1. A vibration test device including a shaker configured to shake a shaker table, the vibration test device comprising:

a drive controller configured to control drive of the shaker by controlling current and voltage applied to the shaker;

a current detector configured to detect the current that controls vibration of the shaker;

a voltage detector configured to detect the voltage that controls vibration of the shaker;

a motion detector configured to detect physical quantities related to a motion of the shaker table;

a determiner configured to perform determination related to a state of the vibration test device, including a failure determination, a failure prediction, and a performance limit determination, based on detection signals output from the current detector, the voltage detector, and the motion detector, and a motion calculation unit configured to calculate physical quantities related to a six degrees-of-freedom (6DoF) motion of the shaker table, based on the detection signal output from the motion detector, wherein the determiner determines the state of the vibration test device, taking into account the physical quantities of the 6DoF motion calculated by the motion calculation unit.

2. The vibration test device of claim 1, further comprising:

a motion storage configured to store a history of physical quantities related to the 6DoF motion calculated by the motion calculation unit, wherein the determiner determines the state of the vibration test device, taking into account the history of the physical quantities of the 6DoF motion stored in the motion storage.

3. The vibration test device of claim 2, wherein the determiner, when any physical quantity related to a motion in a direction other than a shaking direction of the shaker, out of the physical quantities of the 6DoF motions, exceeds a predetermined threshold value, determines at least any of a state where a failure has taken place in the vibration test device, a state where a probability of a failure taking place in the vibration test device is rising, or a state where the vibration test device has reached its performance limit.

4. The vibration test device of claim 2, further comprising:

a transmission rate calculation unit configured to calculate a transmission rate between the 6DoF motion of the shaker table and the current and voltage, based on the physical quantities related to the 6DoF motion of the shaker table, and detection signals output from the current detector and the voltage detector, wherein the determiner determines the state of the vibration test device, taking into account the transmission rate calculated.

5. The vibration test device of claim 4, further comprising:

a transmission rate storage configured to store a history of transmission rates calculated by the transmission rate calculation unit, wherein the determiner determines the state of the vibration test device, taking into account the history of the transmission rate stored in the transmission rate storage.

6. The vibration test device of claim 4, wherein the determiner, when any transmission rate calculated based on the physical quantities related to a motion in a direction other than a shaking direction of the shaker, out of the transmission rates, exceeds a predetermined threshold value, determines at least any of a state where a failure has taken place in the vibration test device, a state where a probability of a failure taking place in the vibration test device is rising, or a state where the vibration test device has reached its performance limit.

7. The vibration test device according to claim 4, wherein the determiner, when any transmission rate calculated based on physical quantities related to a motion in a shaking direction of the shaker, out of the transmission rates, falls short of a predetermined threshold value, determines that the vibration test device has reached its performance limit.

8. The vibration test device of claim 1, wherein the determiner, when any physical quantity related to a motion in a direction other than a shaking direction of the shaker, out of the physical quantities of the 6DoF motions, exceeds a predetermined threshold value, determines at least any of a state where a failure has taken place in the vibration test device, a state where a probability of a failure taking place in the vibration test device is rising, or a state where the vibration test device has reached its performance limit.

9. The vibration test device of claim 1, further comprising:

a transmission rate calculation unit configured to calculate a transmission rate between the 6DoF motion of the shaker table and the current and voltage, based on the physical quantities related to the 6DoF motion of the shaker table, and detection signals output from the current detector and the voltage detector, wherein the determiner determines the state of the vibration test device, taking into account the transmission rate calculated.

10. The vibration test device of claim 9, further comprising:

a transmission rate storage configured to store a history of transmission rates calculated by the transmission rate calculation unit, wherein the determiner determines the state of the vibration test device, taking into account the history of the transmission rate stored in the transmission rate storage.

11. The vibration test device of claim 9, wherein the determiner, when any transmission rate calculated based on the physical quantities related to a motion in a direction other than a shaking direction of the shaker, out of the transmission rates, exceeds a predetermined threshold value, determines at least any of a state where a failure has taken place in the vibration test device, a state where a probability of a failure taking place in the vibration test device is rising, or a state where the vibration test device has reached its performance limit.

12. The vibration test device according to claim 9, wherein the determiner, when any transmission rate calculated based on physical quantities related to a motion in a shaking direction of the shaker, out of the transmission rates, falls short of a predetermined threshold value, determines that the vibration test device has reached its performance limit.

13. The vibration test device of claim 1, wherein the motion detector includes 3-axis acceleration sensors arranged in three or more positions of the shaker table apart from one another.

14. The vibration test device of claim 1, wherein the determination related to the state of the vibration test device further includes either a determination related to estimation of a failed part of the vibration test device, or a determination related to the position of the center of gravity of a test piece held on the shaker table.

15. The vibration test device of claim 1, wherein
when the determiner determines that a failure takes place
   in the vibration test device, the drive controller stops
   the shaker.

16. The vibration test device of claim 1, further compris-
ing:
   a communication unit configured to output, to a database
     connected via a network, a result of the determination
     by the determiner and data used for the determination
     by the determiner.

17. The vibration test device of claim 16, wherein
a predetermined threshold value used in the determination
   by the determiner is updatable, and
the threshold value is updated via the network connected
   to the communication unit.

\*   \*   \*   \*   \*